DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 9

T901,013
FABRIC KNITTED OF DIFFERENT COLOR YARNS

Joseph Whitton Gibson, Jr., 1215 Hillside Blvd., Carrcroft, Wilmington, Del. 19803

Filed Nov. 3, 1971, Ser. No. 195,135
Int. Cl. D04b *1/26*
U.S. Cl. 66—169
No Drawing. 6 Pages Specification

A knitted fabric of plain stitch construction of at least 40 courses per inch consists of two yarns of different color in alternating courses. When two yarns of different color, e.g., differing in hue are used in alternate feeds in the knitting of seamless hosiery, a fabric is obtained which appears to be a solid shade of the blended color of the two feed yarns. The effect of this invention can be achieved with different colored yarns of less than about 60 denier, including monofilament and multifilament yarns, textured and nontextured, in the preparation of fine gauge fabrics having greater than 40 courses per inch.